Patented Sept. 18, 1928.

1,684,778

UNITED STATES PATENT OFFICE.

ALFRED PHILIPS, OF FRANKFORT-ON-THE-MAIN, AND MARTIN DABELOW, OF HOCHST-ON-THE-MAIN, GERMANY, ASSIGNORS TO GRASSELLI DYESTUFF CORPORATION, OF NEW YORK, N. Y., A CORPORATION OF DELAWARE.

MORDANT AZO DYESTUFFS AND PROCESS OF PREPARING THEM.

No Drawing. Application filed April 19, 1927, Serial No. 185,065, and in Germany April 27, 1926.

Our present invention relates to mordant azo dyestuffs and a process of preparing them.

We have found that valuable dyestuffs are obtained by combining the 2.6-dihydroxy-naphthalene-3-carboxylic acid with diazo compounds of ortho-aminohydroxy bodies of the aromatic series or of halogen-, nitro- or sulfo derivatives thereof. Thus, dyestuffs are obtained of a pronounced mordant character, giving on wool, when treated in a chrome bath, olive-green to greenish-black dyeings of excellent properties as to fastness. The new dyestuffs are by far superior to the products hitherto used for the said purpose, particularly as regards their fastness to washing, fulling and potting. Besides, the dyebaths prepared with them are exhausted to a much greater extent. Moreover the new dyestuffs have the valuable property of giving dyeings by the one-bath chroming process.

The dyestuffs can be produced by coupling the diazo compound of an ortho-amino-hydroxy body of the aromatic series obtained in the usual manner, with an alkaline solution of 2.6-dihydroxynaphthalene-3-carboxylic acid and isolating the dyestuffs by salting out or in another similar manner.

The following examples serve to illustrate our invention, but they are not intended to limit it thereto; the parts are by weight:

(1.) 189 parts of 2-amino-1-phenol-4-sulfonic acid are dissolved in water, mixed with 360 parts of hydrochloric acid of 20° Bé. and diazotized by means of a solution of 70 parts of sodium nitrite. The diazo solution thus prepared is coupled with a solution of 204 parts of 2.6-dihydroxynaphthalene-3-carboxylic acid in the presence of 500 parts of calcined sodium carbonate, and when the coupling is complete, the dyestuff which partly separates as a dark powder, is completely isolated by adding common salt. It dyes wool in the single-bath chroming process olive-green tints of excellent properties as to fastness.

The dyestuff has the following composition:

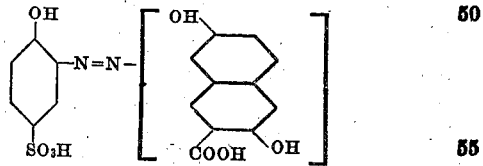

(2.) 223.5 parts of 4-chloro-2-aminophenol-6-sulfonic acid are diazotized in an aqueous solution by means of 70 parts of sodium nitrite in the presence of 360 parts of hydrochloric acid of 20° Bé. The diazo compound so obtained is coupled with an alkaline solution of 204 parts of 2.6-dihydroxynaphthalene-3-carboxylic acid. The dyestuff, which is isolated in the usual manner dyes wool in the chrome bath olive-green tints of excellent fastness properties.

The dyestuff has the following composition:

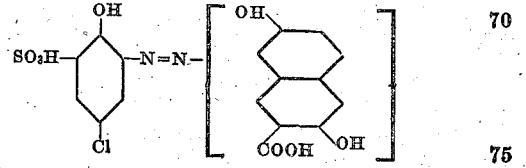

(3.) 154 parts of 4-nitro-2-aminophenol are dissolved in water, mixed with 360 parts of hydrochloric acid of 20° Bé. and diazotized with a solution of 70 parts of sodium nitrite. The diazo compound is then run into a solution of 204 parts of 2.6-dihydroxynaphthalene-3-carboxylic acid, to which 500 parts of calcined sodium carbonate have been added. The dyestuff, which separates as a dark powder, is isolated as usual. It dyes wool by the single-bath chroming process olive-green shades of excellent fastness to washing, fulling and potting.

The dyestuff has the following composition:

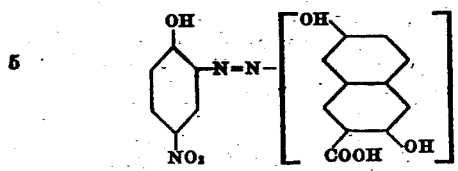

(4.) 234 parts of 2-amino-1-phenol-4-nitro-6-sulfonic acid are mixed with water and 360 parts of hydrochloric acid of 20° Bé. and diazotized in the usual manner by means of a solution of 70 parts of sodium nitrite. The diazo compound thus prepared is coupled with a solution of 204 parts of 2.6-dihydroxy-naphthalene-3-carboxylic acid in the presence of 500 parts of calcined sodium carbonate, and the separating dyestuff is isolated by adding common salt. It dyes wool both in the chroming process and in the one-bath chroming process dark green tints of excellent properties as to fastness.

The dyestuff has the following composition:

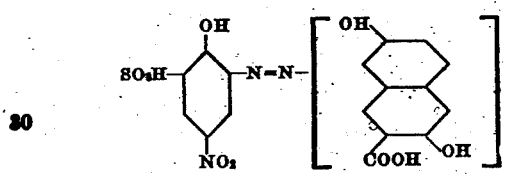

(5.) 188.5 parts of 2-amino-4-chloro-6-nitro-1-phenol are mixed with water and 360 parts of hydrochloric acid of 20° Bé. and diazotized in the usual manner by means of a solution of 70 parts of sodium nitrite. The diazo compound thus obtained is coupled with a solution of 204 parts of 2.6-dihydroxy-naphthalene-3-carboxylic acid in the presence of 500 parts of calcined sodium carbonate, and the resulting dyestuff is isolated as usual. It dyes wool both in the chroming process and in the one-bath chroming process greenish-black shades of excellent fastness properties.

The dyestuff has the following composition:

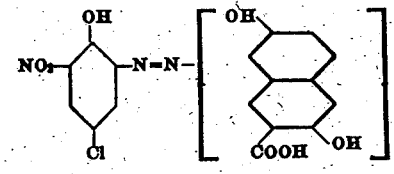

We claim:
1. The process of preparing mordant dyestuffs by combining the diazo compound of an ortho-aminohydroxy compound of the aromatic series with 2.6-dihydroxynaphthalene-3-carboxylic acid.
2. The process of preparing a mordant dyestuff by combining the diazo compound of 2-amino-1-phenol-4-nitro-6-sulfonic acid with 2.6-dihydroxynaphthalene-3-carboxylic acid.
3. As new products, mordant dyestuffs substantially identical with the dyestuffs produced by the hereindescribed process of combining the diazo compound of an ortho-aminohydroxy compound of the aromatic series with 2.6-dihydroxynaphthalene-3-carboxylic acid, said dyestuffs being dark powders dyeing wool in the chrome-bath olive-green to greenish-black tints of excellent properties as to fastness.
4. As a new product, the mordant dyestuff substantially identical with the dyestuff produced by the hereindescribed process of combining the diazo compound of 2-amino-1-phenol-4-nitro-6-sulfonic acid with 2.6-dihydroxynaphthalene-3-carboxylic acid, the said dyestuff being a dark powder dyeing wool both in the chroming process and in the one-bath chroming process dark green tints of excellent properties as to fastness.
5. Materials dyed with the dyestuffs referred to in claim 3.
6. Materials dyed with the dyestuff referred to in claim 4.

In testimony whereof we affix our signatures.

Dr. ALFRED PHILIPS.
MARTIN DABELOW.